(12) United States Patent
Alnaseri (10) Patent No.: US 11,946,576 B2
(45) Date of Patent: Apr. 2, 2024

(54) PIPE ADAPTER

(71) Applicant: Anees Alnaseri, Westlake, OH (US)

(72) Inventor: Anees Alnaseri, Westlake, OH (US)

( * ) Notice: Subject to any disclaimer, the term of this patent is extended or adjusted under 35 U.S.C. 154(b) by 77 days.

(21) Appl. No.: 17/530,769

(22) Filed: Nov. 19, 2021

(65) Prior Publication Data

US 2022/0163149 A1 May 26, 2022

Related U.S. Application Data (60) Provisional application No. 63/116,462, filed on Nov. 20, 2020.

(51) Int. Cl.
| | | |
|---|---|---|
| *F16L 25/14* | (2006.01) | |
| *F16L 21/08* | (2006.01) | |
| *F16L 23/02* | (2006.01) | |
| *F16L 37/092* | (2006.01) | |
| *F16L 25/12* | (2006.01) | |

(52) U.S. Cl.
CPC ............ *F16L 25/14* (2013.01); *F16L 21/08* (2013.01); *F16L 23/02* (2013.01); *F16L 37/0925* (2013.01); *F16L 25/12* (2013.01)

(58) Field of Classification Search
CPC ......... F16L 21/007; F16L 21/08; F16L 23/02; F16L 23/024; F16L 25/14; F16L 25/04; F16L 37/092; F16L 37/0925; F16L 37/0927; F16L 19/06; F16L 19/065; F16L 19/0656; F16L 17/00; F16L 17/02
See application file for complete search history.

(56) References Cited

U.S. PATENT DOCUMENTS

| | | | | | |
|---|---|---|---|---|---|
| 3,552,781 | A | * | 1/1971 | Helland | F16L 17/02 285/356 |
| 4,127,289 | A | * | 11/1978 | Daspit | F16L 21/08 285/348 |
| 5,205,356 | A | * | 4/1993 | Bridges | E21B 33/03 166/85.1 |
| 5,398,980 | A | * | 3/1995 | Hunter | F16L 21/08 285/414 |

* cited by examiner

*Primary Examiner* — Aaron M Dunwoody
(74) *Attorney, Agent, or Firm* — McDonald Hopkins LLC (57) ABSTRACT

Provided is a pipe adapter assembly that can join different sized pipes together. The pipe adapter assembly may generally comprise a housing, an insert, and a grip actuator. The housing may comprise a lumen and a bore positioned inwardly from a first end. The insert may comprise a passage having a plurality of teeth and a tapered outer surface with at least one slot. The grip actuator may comprise a flanged body and a protrusion wherein the protrusion is configured to fit within the bore of the housing. The protrusion may further include an abutment surface that extends concentrically about an aperture through the grip actuator. In an embodiment, the pipe adapter is configured to receive a pipe member through the lumen, passage, and aperture and to selectively lock the housing to the pipe member.

20 Claims, 15 Drawing Sheets

Figure 13

PIPE ADAPTER

CROSS REFERENCE TO RELATED APPLICATIONS

This application claims priority to U.S. Provisional Patent Application No. 63/116,462 entitled "Pipe Adaptor" filed on Nov. 20, 2020, which is hereby incorporated by reference in its entirety.

FIELD OF INVENTION

The present disclosure generally relates to a pipe adapter or pipe end fittings for use with joining different sized pipes together.

BACKGROUND

Figure 1:
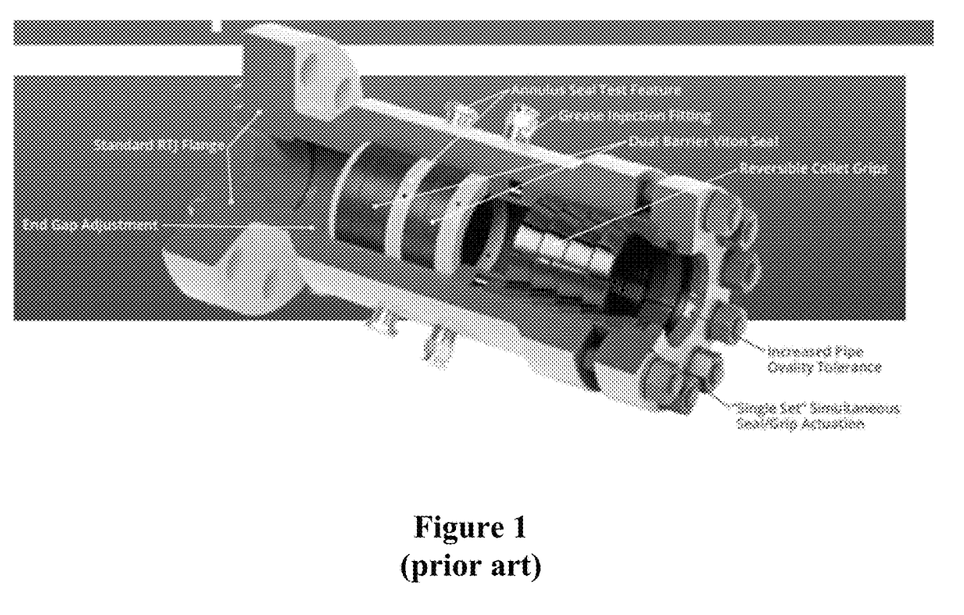
FIG. 1 is a cross sectional view of a pipe adapter of the prior art.

Plastic and metal pipes have long been used for the communicating fluids such as liquids and gases. These pipes can include connectors or fittings utilized to connect together different sections of pipe. Such fittings must be capable of providing a fluid tight seal over a range of temperatures, pressures, and a variety of exterior ambient conditions. The oil and gas industries use various types of pipe connectors to connect flanges or other parts with pipes in high pressure conditions. In one such instance, pipes used in the oil and gas industry may need to be installed under water and have a large structural load component. One such example of a subsea pipeline connector is the GripLock™ connector provided by Oil States as illustrated by FIG. 1 used for repairs, re-routes and abandonment projects. This connector utilizes collet grips that mechanically attach to a pipe and create a permanent, structural flanged end on the pipe.

However, pipe installers are in need of improved solutions to reduce cost and improve efficiency while maintaining the integrity if the piping system. As such, there is a desire to provide an improved pipe adapter to assist with connecting pipes of different size diameters.

DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which.

DETAILED DESCRIPTION

Reference will now be made in detail to exemplary embodiments of the present teachings, examples of which are illustrated in the accompanying drawings. It is to be understood that other embodiments may be utilized and structural and functional changes may be made without departing from the respective scope of the present teachings. Moreover, features of the various embodiments may be combined or altered without departing from the scope of the present teachings. As such, the following description is presented by way of illustration only and should not limit in any way the various alternatives and modifications that may be made to the illustrated embodiments and still be within the spirit and scope of the present teachings. In this disclosure, any identification of specific shapes, materials, techniques, arrangements, etc. are either related to a specific example presented or are merely a general description of such a shape, material, technique, arrangement, etc.

Figure 2:
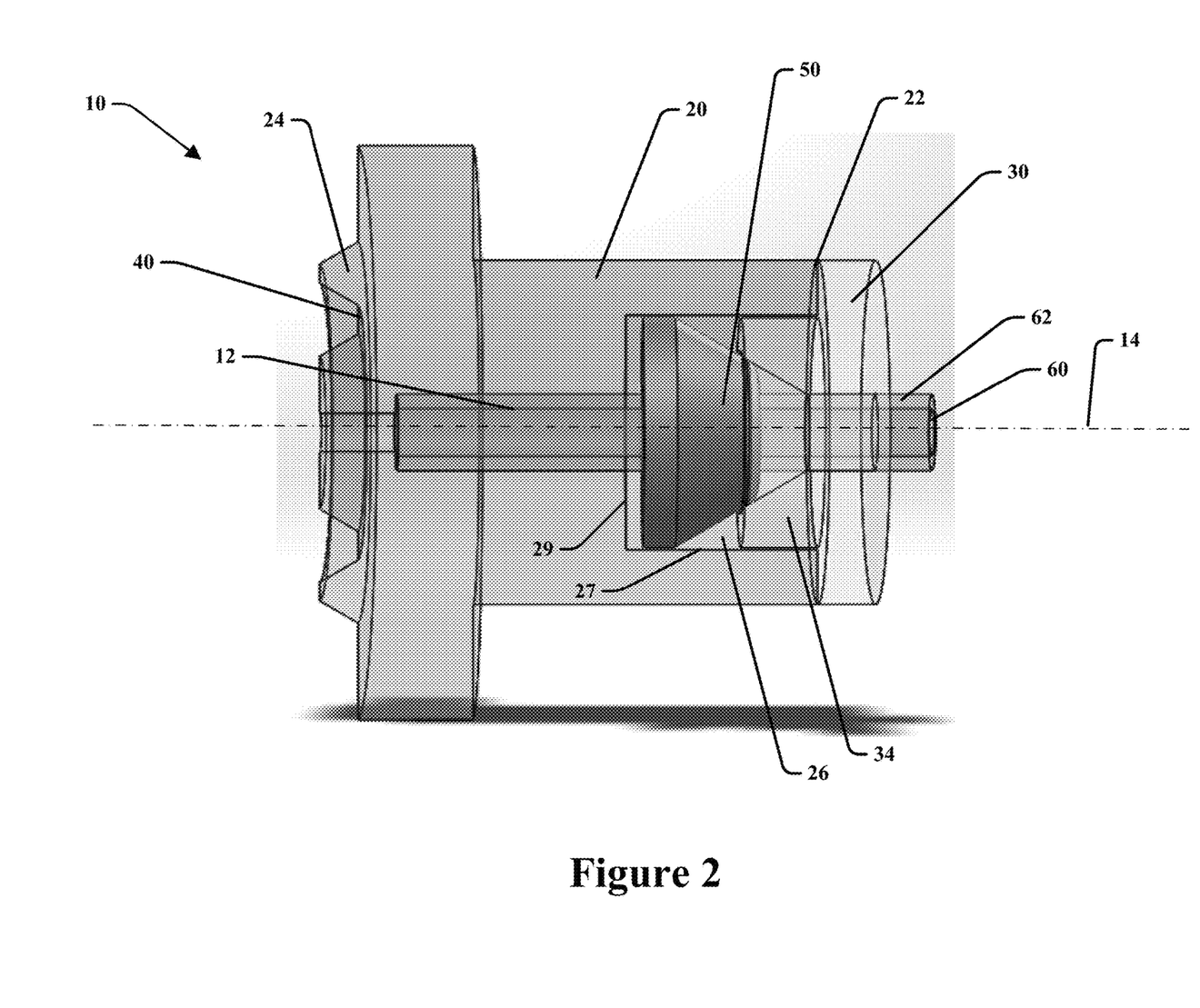
FIG. 2 is a cross sectional view of an embodiment of a pipe adapter of the instant disclosure.
Figure 3:
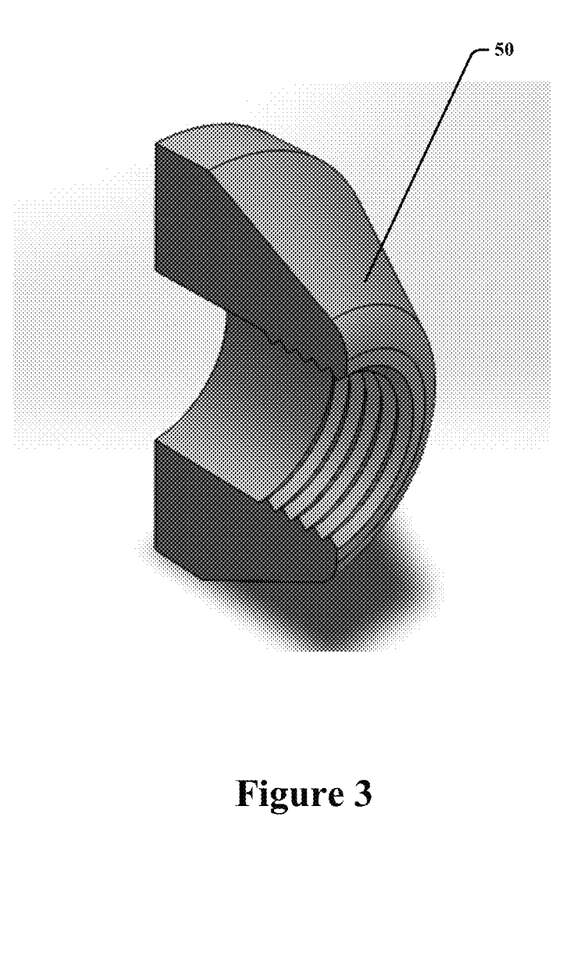
FIG. 3 is a partial perspective view of an embodiment of an insert for the pipe adapter of the instant disclosure.
Figures 4A, 4B, 4C, 4D:
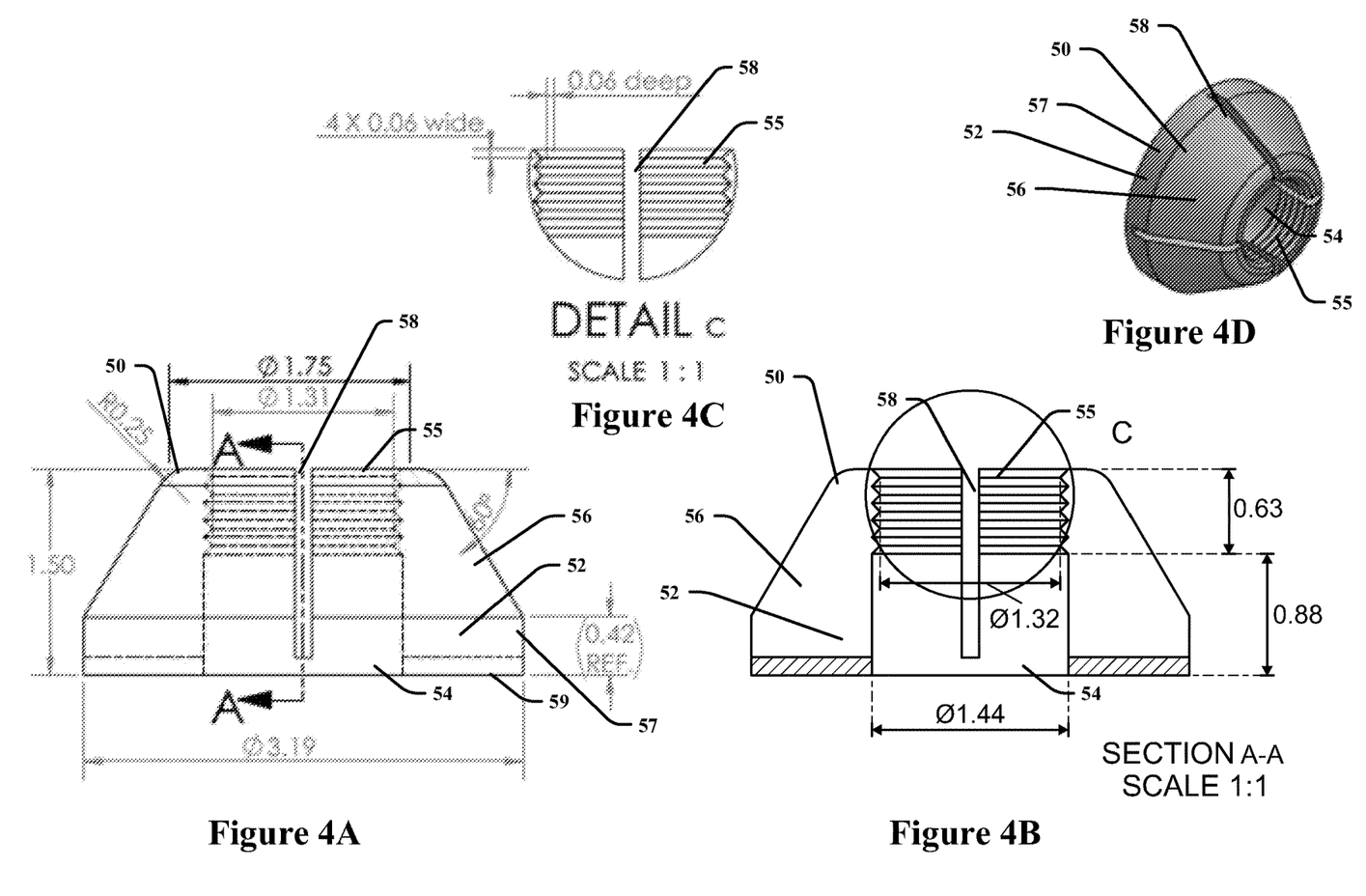
FIGS. 4A-4D are various views of an embodiment of an insert for the pipe adapter of the instant disclosure.

Provided in this disclosure is an embodiment of a pipe adapter 10 configured to securely attached pipe members of different diameters to one another in a secure and leak free configuration. FIG. 2 illustrates a cross sectional view of an embodiment of the pipe adapter 10 that includes a housing 20 that defines a lumen 12 aligned along an axis 14 therethrough for the communication of a fluid between a first side 22 and a second side 24 of the housing. A grip actuator 30 configured to be attached to the first side 22 of the housing 20. A coupling surface 40 along the second side 24 of the housing 20 that is configured to be attached to a second pipe member (not shown). An insert 50 configured to be placed within the housing 20. A pipe member 60 configured to be inserted within the lumen 12 of the housing 20 and secured therein by the insert 50 and the grip actuator 30.

The housing 20 may include a bore 26 positioned inwardly from the first side 22 such that the bore 26 is configured to receive the insert 50 as well as a portion of the grip actuator 30 to secure the pipe member 60 therein. The bore 26 may be defined by a radial inner wall 27 and a shoulder wall 29 wherein the radial inner wall 27 extends generally parallel to the axis 14 of the housing 20 and concentric to the lumen 12 while the shoulder wall 29 is aligned generally perpendicularly to the axis 14 of the housing 20 and concentric to the lumen 12.

The insert 50 (as illustrated by FIGS. 3 and 4A-4D) includes a body 52 that defines a passage 54 there through and an outer surface 56. The body 52 may be shaped to be fit within the bore 26 of the housing. The body 52 may include at least one slot 58 formed therein to allow for portions of the insert body 52 to be slightly deformed to engage the pipe member 60 when positioned within the passage 54. The insert 50 may have one, two, three, four slots 58, etc., or any number of slots 58 and this disclosure is not limited. The passage 54 may include a plurality of teeth 55 positioned along an inner surface of the body 52.

The outer surface 56 include a tapered or angled configuration that is generally complementary to an abutment surface 36 of the grip actuator 30. In an embodiment, the insert may include a generally frustoconical shape. The insert 50 may include an outer radial wall 57 and a base wall 59 generally opposed from the outer surface 56. FIGS. 4A-4D illustrate various dimensions that are contemplated by the insert 50 and can be utilized but this disclosure is not limited as the components described herein may be scalable to any size pipe members as desired.

Figure 5A:
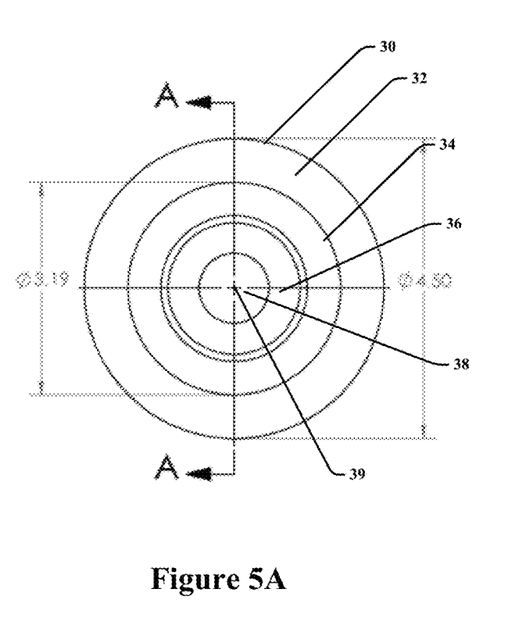
FIGS. 5A and 5B are various views of an embodiment of a grip actuator for the pipe adapter of the instant disclosure.
Figure 5B:
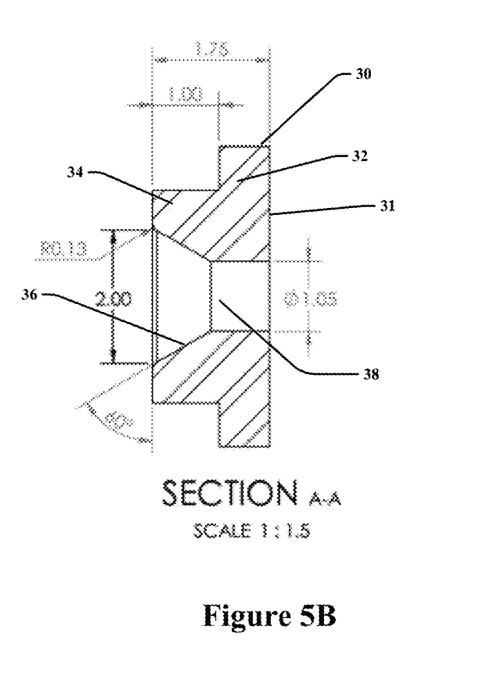
Figure 8A:
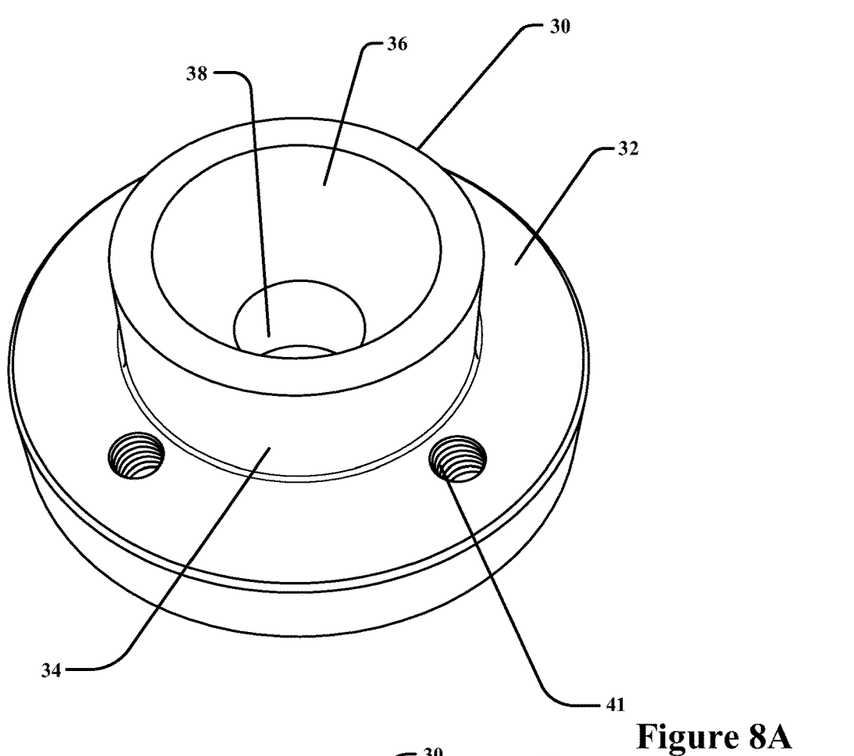
FIGS. 8A and 8B are various views of an embodiment of a grip actuator for the pipe adapter of the instant disclosure.
Figure 8B:
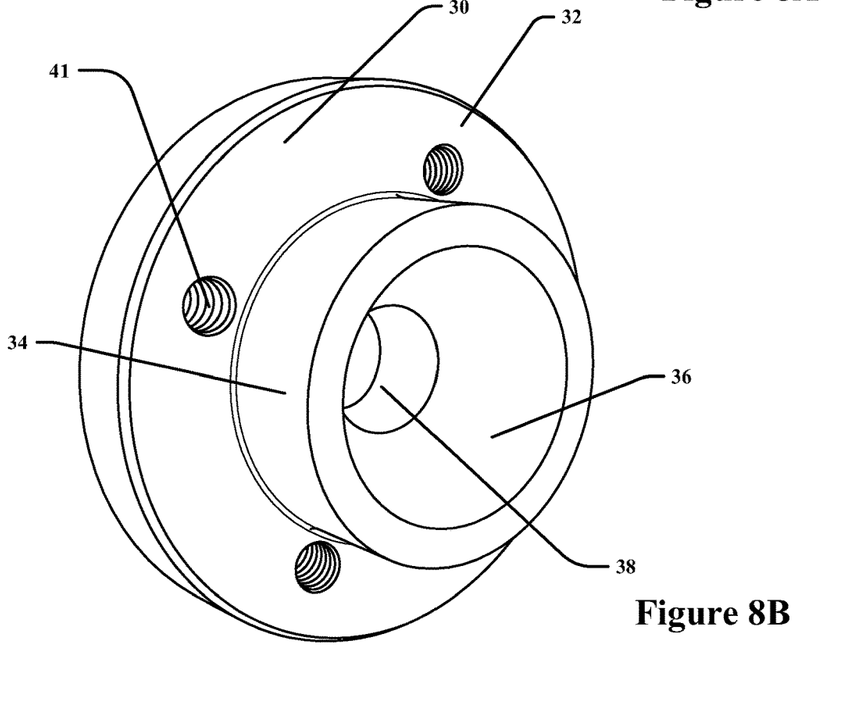
Figure 9A:
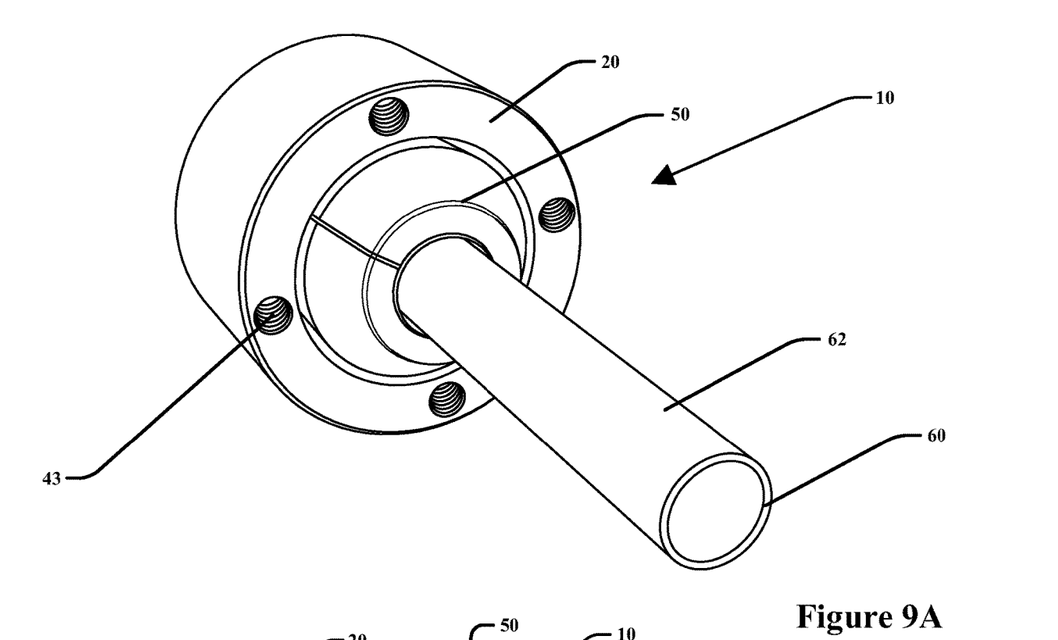
FIGS. 9A, 9B, 9C, 9D, and 9E are various views of portions of the pipe adapter of the instant disclosure.
Figure 9B:
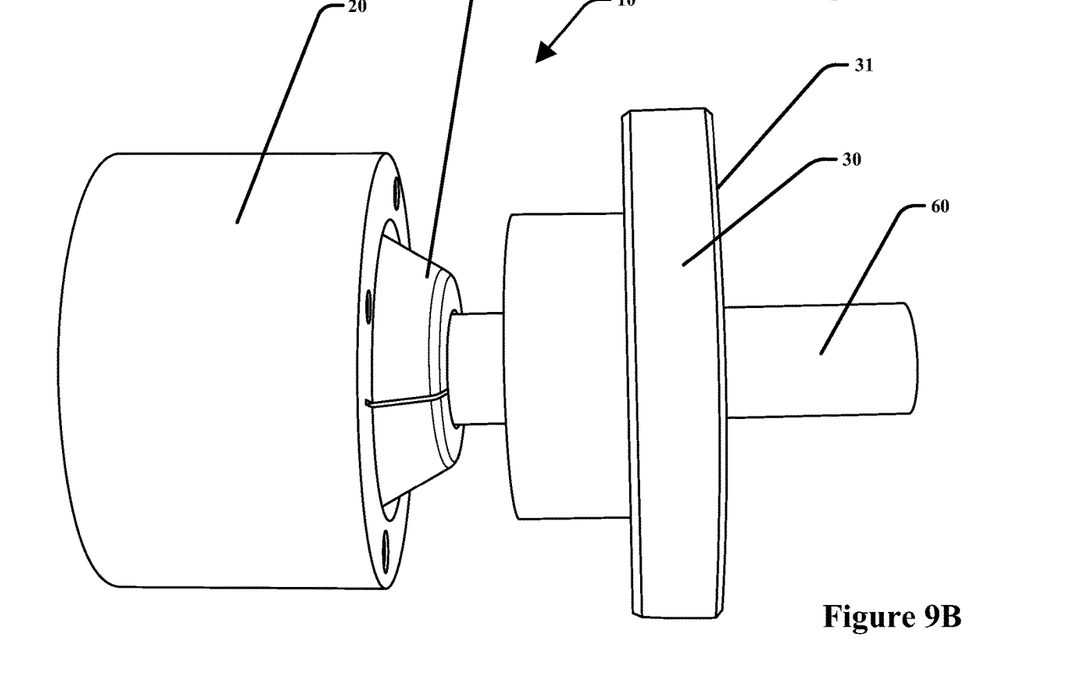
Figure 9C:
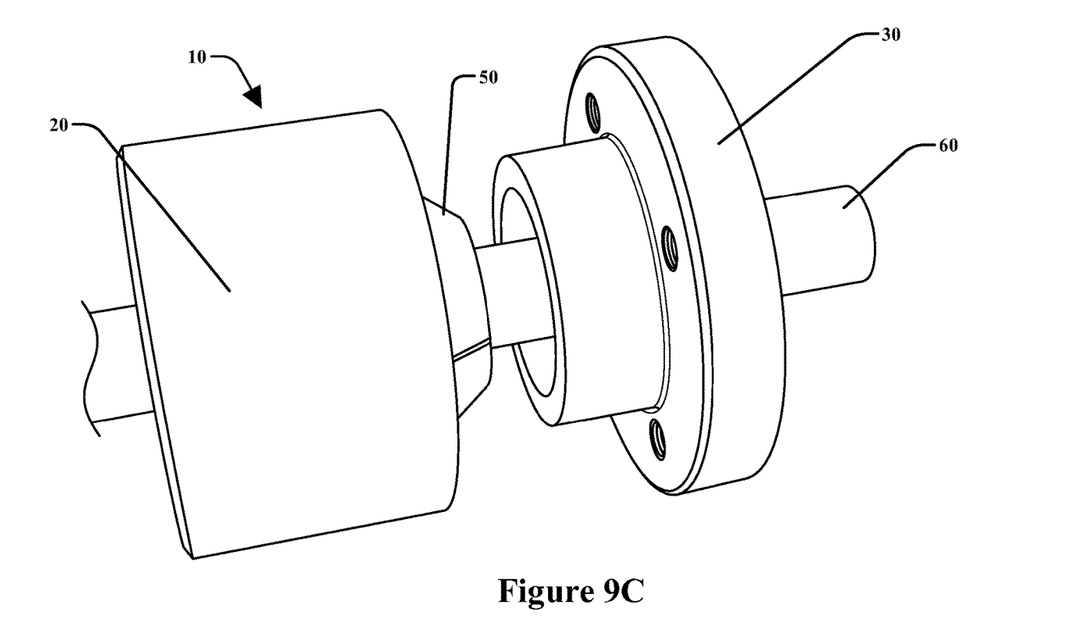
Figure 9D:
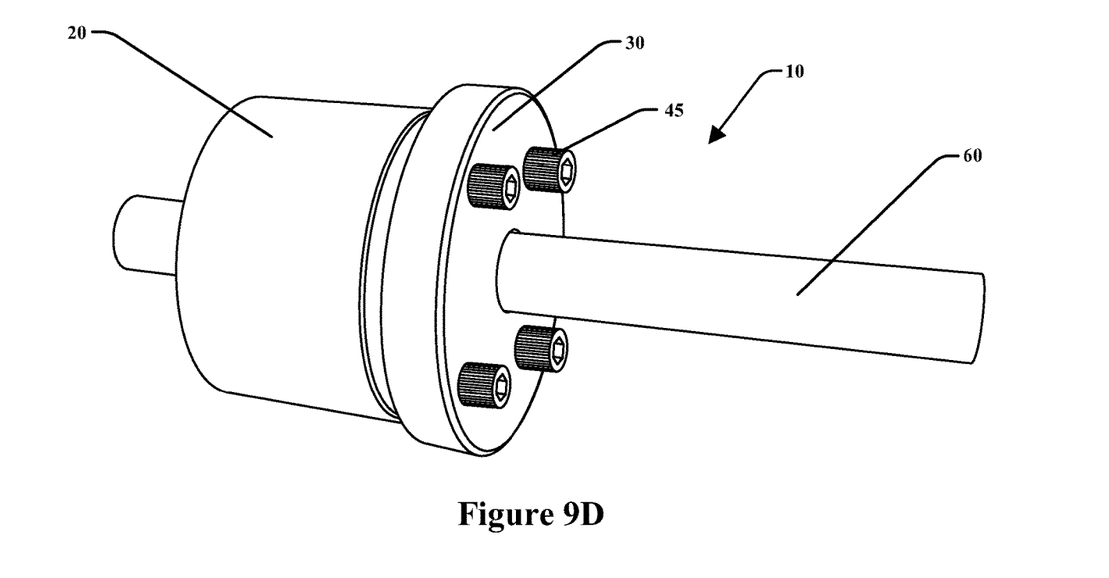
Figure 9E:
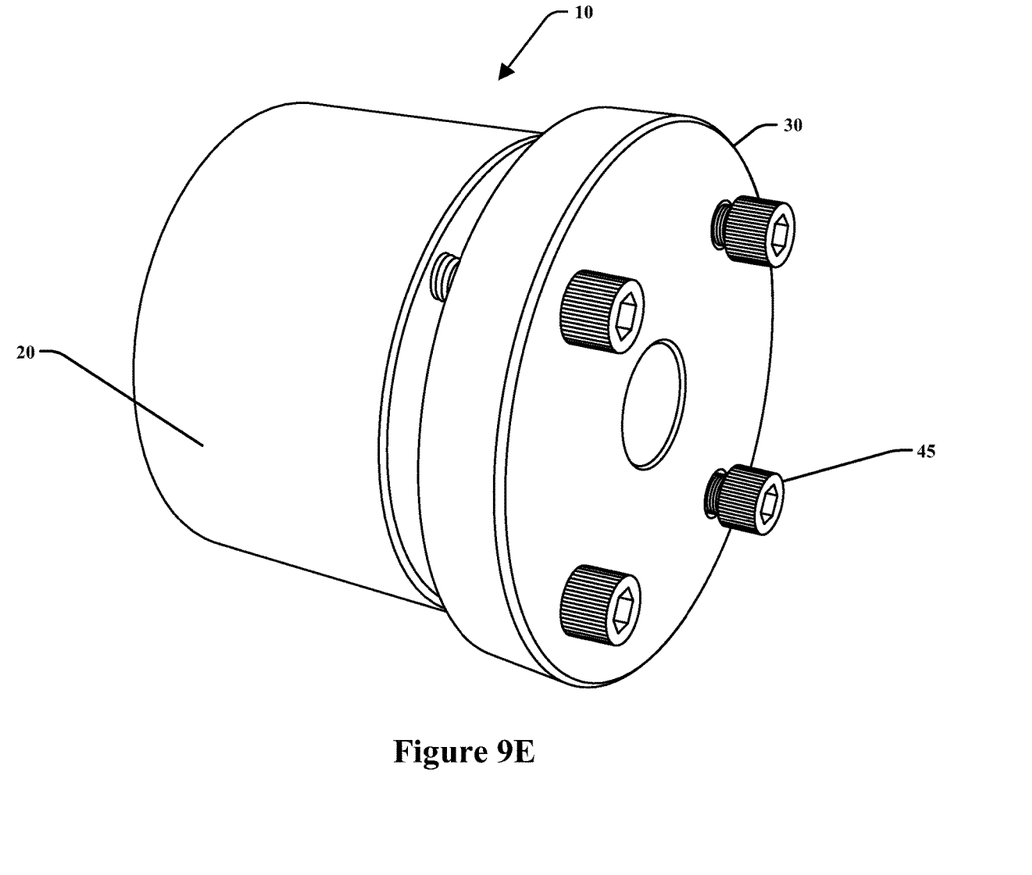
Figure 10:
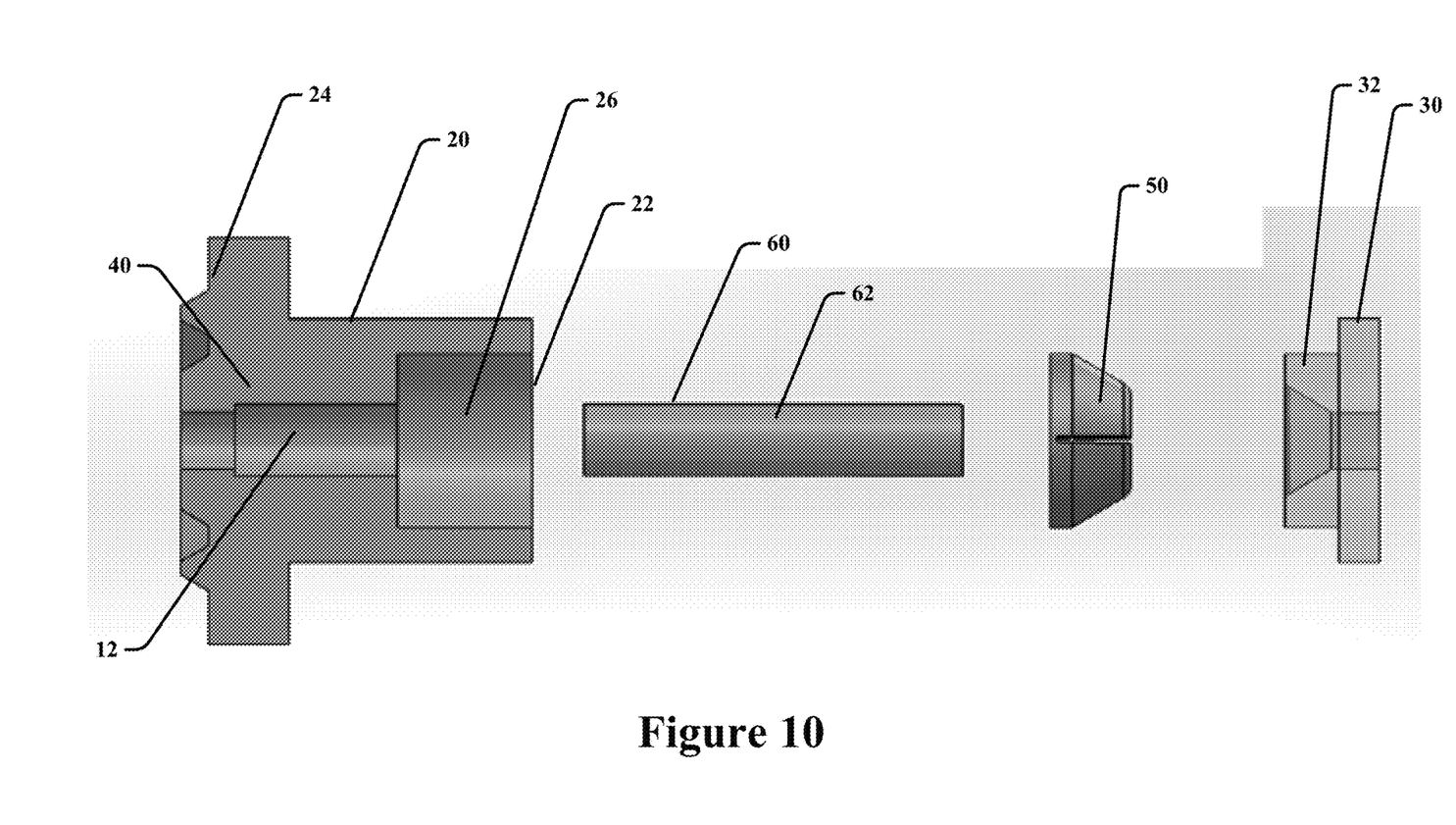
FIG. 10 is an exploded cross sectional view of the pipe adapter of the instant disclosure.
Figure 11A:
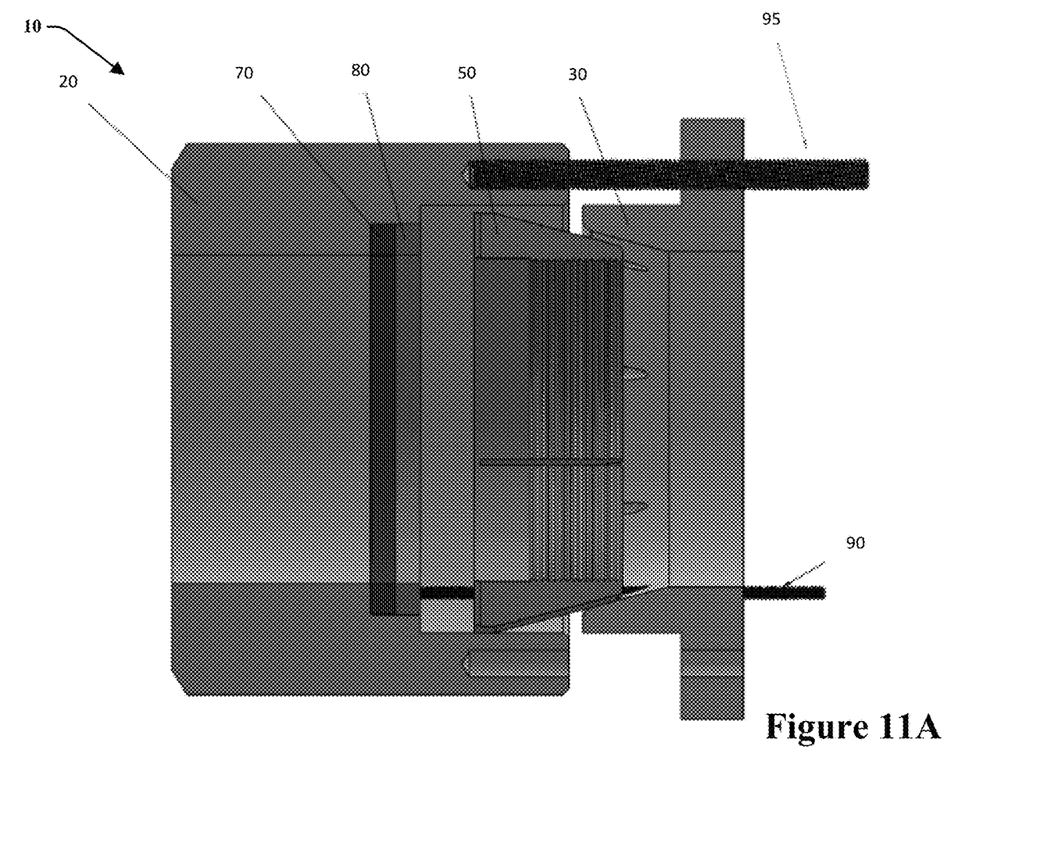
FIGS. 11A and 11B are various views of an embodiment of a pipe adapter including a leak sealing mechanism of the instant disclosure.
Figure 11B:
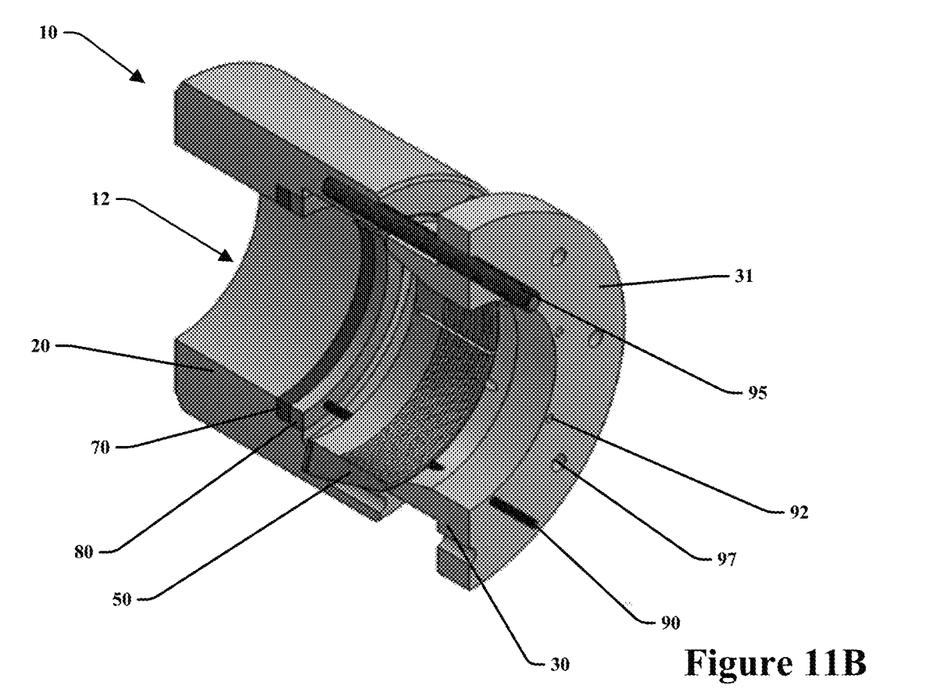
Figure 12:
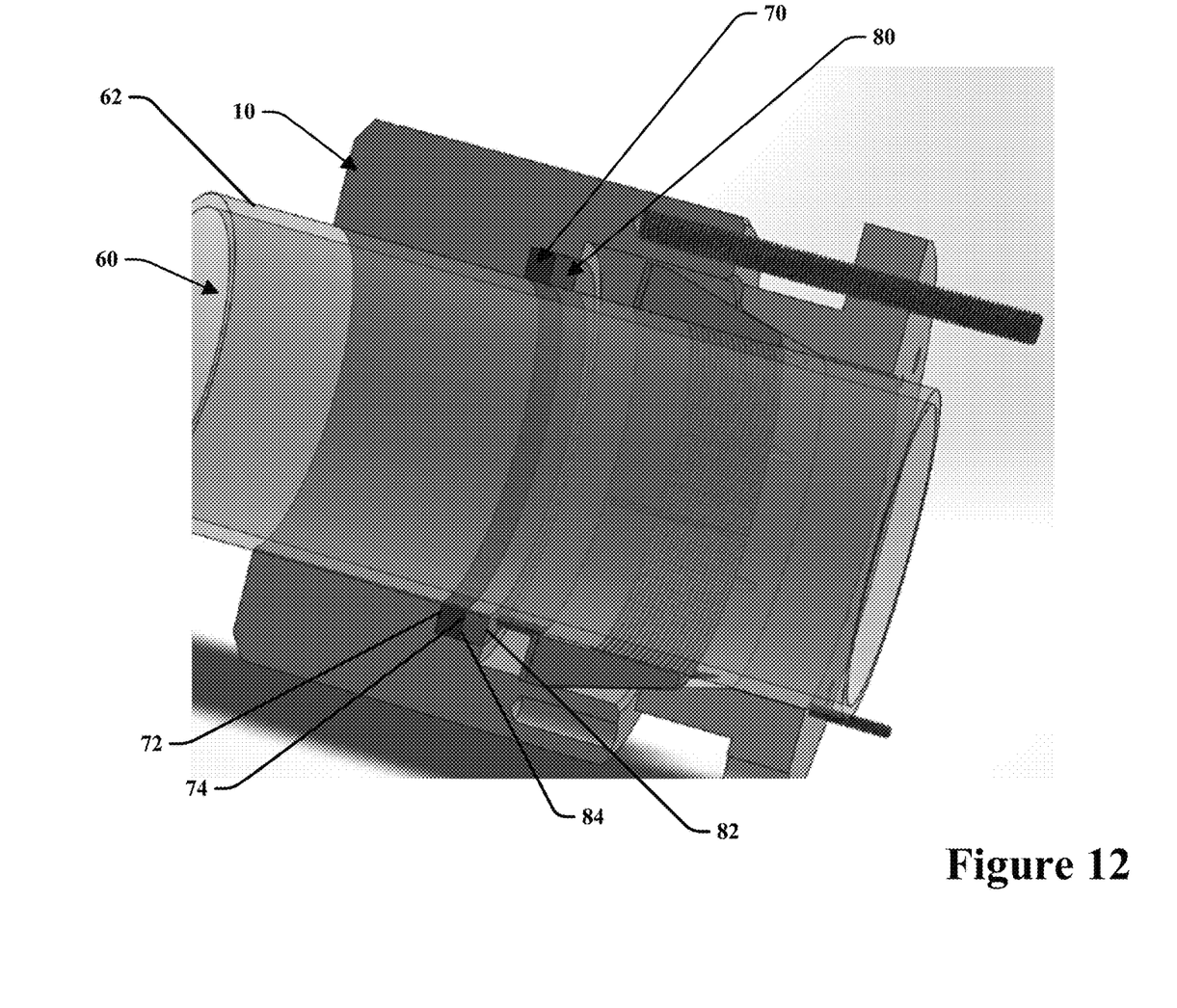
FIG. 12 is a cross sectional view of an embodiment of a pipe adapter including a leak sealing mechanism of the instant disclosure.
Figure 13:
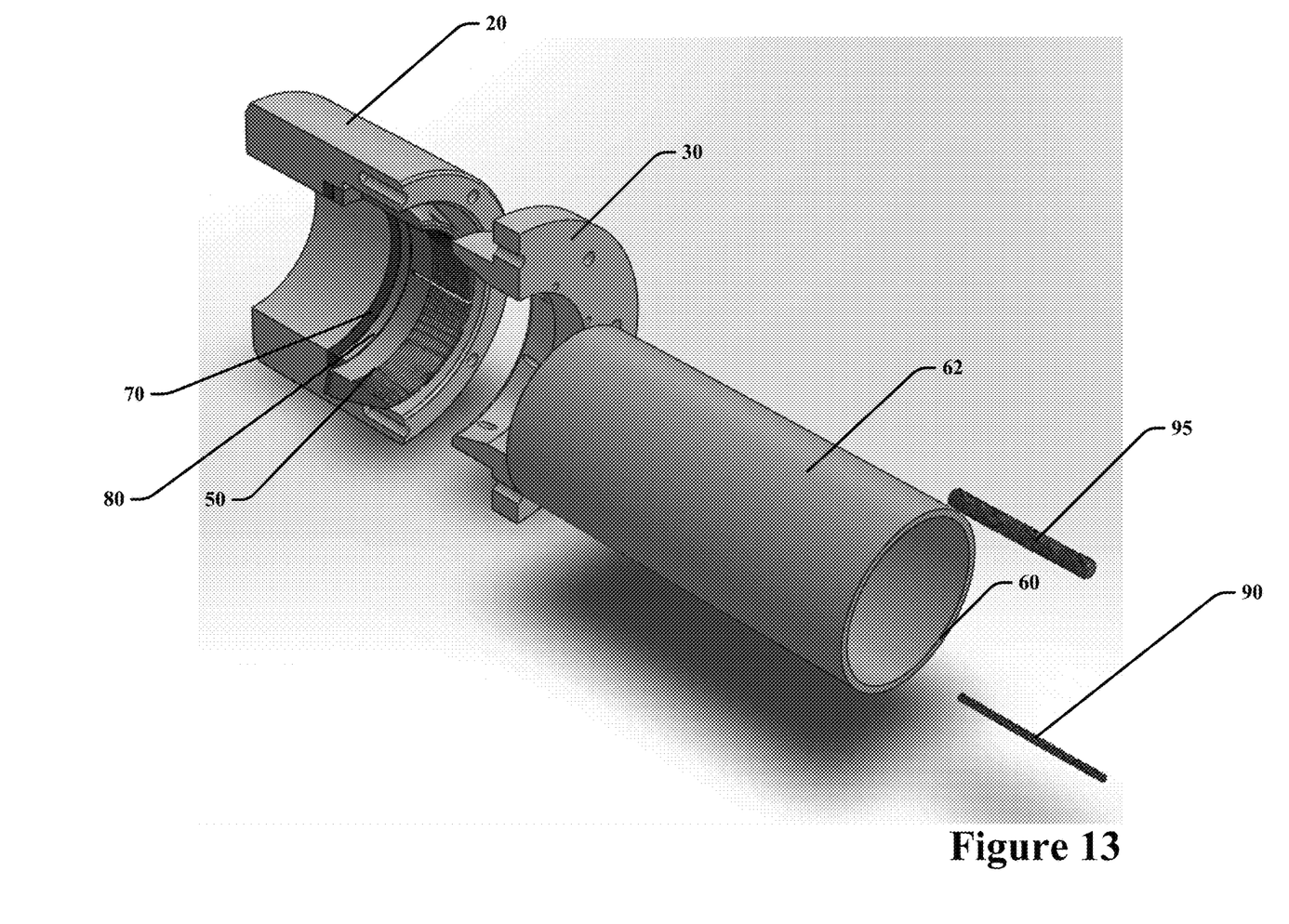
FIG. 13 is an exploded cross sectional view of the pipe adapter including a leak sealing mechanism of the instant disclosure.

The grip actuator 30 (as illustrated by FIGS. 5A and 5B) may include a generally circular flanged body 32 with a protrusion 34 that defines an abutment surface 36. The protrusion 34 may be generally circular and have a complementary shaped outer perimeter relative to the bore 26 of the housing 20 such that the protrusion 34 is configured to fit within the bore 26 of the housing 20. The abutment surface 36 may be positioned radially inwardly relative to the perimeter of the protrusion 34 and may extend about an aperture 38 configured to receive the pipe member 60 therein. The abutment surface 36 may have a configuration that is generally complementary relative to the outer surface 56 of the insert 50. In an embodiment, the abutment surface 36 is tapered towards the aperture 38 and is generally concentric to the aperture 38. The taper of the abutment surface 36 may have an angle that is about 60 degrees from a perpendicular plane relative to a central axis 39 of the aperture 38. The abutment surface 36 is configured to frictionally abut against the outer surface 56 of the insert 50 to slightly deflect portions of the insert to allow teeth to depress against the pipe member 60. FIGS. 5A and 5B illustrate various dimensions that are contemplated by the grip actuator 30 and can be utilized but this disclosure is not limited as the components described herein may be scalable to any size pipe members as desired. In an embodiment, the flanged body 32 and the protrusion 34 of the grip actuator 30 are formed from a continuous piece of material such as a metal, polymer or alloy. Further, aperture's 41 (See FIGS. 8A and 8B) may be formed along the flanged body 32 of the grip actuator 30 to allow for fasteners 45 (See FIGS. 9D and 9E) to extend therethough for selective attachment with matching apertures 43 (See FIG. 6A) positioned about the bore 26 and in the housing 20.

As illustrated by FIG. 2, the bore 26 of the housing 20 includes a particular shape wherein the insert 50 and protrusion 34 are configured to be received therein. Here, the axial lengths of the insert 50, protrusion 34, and bore 26 are arranged in such a way that once the flanged body 32 of the grip actuator 30 is positioned towards the first end 22 of the housing, the abutment surface 36 of the protrusion 34 abuts against the outer surface 56 of the insert 50. The base wall 59 of the insert 50 may abut against the shoulder wall 29 of the housing 20 and cause the teeth 55 along the passage 54 of the insert to bias radially inwardly against an outer surface 62 of the pipe member 60. The fasteners 45 may be tightened through the flanged body 32 to further translate the protrusion 34 axially along the axis 14 and against the insert 50 to tighten the grip actuator 30 to the housing 20 and thereby lock the pipe member 60 therein.

Stated another way, provided is a pipe adapter with a grip or lock that is a mechanically actuated hard alloyed steel grade adapter that can be used to join and lock two different sized pipes together. It uses an adapter that has 60 degrees on the circumference with a hole in the center bigger than pipe, tube or round bar diameter. The tube/pipe grip can be used to hold tight any object or fitting on any round tube, pipe, or round bar. The adapter put inside a housing round, and the locking/Gripping force came from another steel has holes for bolts and neck with 60 degrees taper in the inside diameter. When tightening the screws in the housing, they push in the adapter and the tapers 60 degrees contact each other and provide closing movement on the ID of the adapter to the OD of the shaft/pipe or Tube. The grip is best for high pressure applications. Scalable.

Turning to FIGS. 11A-11B, 12, and 13, shown is the adaptor 10 further including a leak sealing mechanism comprising a first ring 70 and a second ring 80. The first ring 70 may be a rubber ring, packing seal, or other similar compressible material. The second ring 80 may be a steel ring, or other similar non-compressible material. It is noted that the opposite configuration is also herein contemplated where the first ring 70 may be a steel ring, or other similar non-compressible material and the second ring 80 may be a rubber ring, packing seal, or other similar compressible material.

In an embodiment, the first ring 70 and the second ring 80 may be positioned adjacent, in physical contact, or next to one another. In an embodiment, the first ring 70 and the second ring 80 may be positioned between the housing 20 and the insert 50. In an embodiment, the first ring 70 and the second ring 80 may be positioned together between and abut the base wall 59 of the insert 50 and the shoulder wall 29 of the housing 20. For example, the first ring 70 may generally contact and abut the shoulder wall 29 of the housing 20 on a first side 72 of the first ring 70 and a second side 74 of the first ring 70 may generally contact and abut the second ring 80 (e.g. at the second side 84 of the second ring 80). For example, the second ring 80 may generally contact and abut the base wall 59 of the insert 50 on a first side 82 of the second ring 80 and a second side 84 of the second ring 80 may generally contact and abut the first ring 70 (e.g. at the second side 74 of the first ring 70).

The first ring 70 and the second ring 80 may be any shape, size, thickness, weight, and material as desired. In an embodiment, the first ring 70 and the second ring 80 may be generally the same size, circumference, thickness, and the like. It is also noted that the first ring 70 and the second ring 80 may have different sizes, circumferences, thicknesses, and the like. The first ring 70 and the second ring 80 may be generally circular, although it is noted that the first ring 70 and the second ring 80 may be any other shape as desired.

In an embodiment, the first ring 70, being compressible, may be pressed by the second ring, being non-compressible. The leak sealing mechanism may further include at least one leak sealing stud 90. The leak sealing mechanism may further include at least one grip stud 95. In an embodiment, the leak sealing mechanism may include at least one leak sealing stud 90 and at least one grip stud 95. For example, the leak sealing mechanism may include 2, 3, 4, 5, 6, 7, 8, 9, 10, etc. leak sealing studs 90. For example, the leak sealing mechanism may include 2, 3, 4, 5, 6, 7, 8, 9, 10, etc. grip studs 95. In embodiment, the leak sealing mechanism may include 8 leak sealing studs 90 and 8 grip studs 95. The leak sealing studs 90 may generally traverse the adaptor 10, including the grip actuator 30 and the housing 20 of the adaptor, see FIG. 12 for example. The grip studs 95 may generally traverse the adaptor 10, including the grip actuator 30 and the housing 20 of the adaptor, see FIG. 12 for example.

The leak sealing studs 90 and grip studs 95 may be any shape, size, thickness, weight, and material as desired. In an embodiment, the leak sealing studs 90 and grip studs 95 may be generally circular although it is noted that the leak sealing studs 90 and grip studs 95 may be any other shape as desired.

In an embodiment, the leak sealing studs 90 may have a smaller circumference than the grip studs 95. In an embodiment, the leak sealing studs 90 may have a greater circumference than the grip studs 95.

In an embodiment, the leak sealing studs 90 may extend through the flanged body 32 and the protrusion 34 of the grip actuator 30. In an embodiment, the grip studs 95 may extend through the flanged body 32 of the grip actuator 30 into the housing (e.g., not passing through the protrusion 34 of the grip actuator 30). The leak sealing studs 90 may be positioned on an inner or near inner circumference of a face plate 31 of the grip actuator 30 and the grip studs 95 may be positioned on an outer or near outer circumference of the face plate 31 of the grip actuator 30. The leak sealing studs 90 and grip studs 95 may be distributed evenly about the circumference of the face plate 31 to provide equivalent pressure when secured within the adaptor 10. In an embodiment, the leak sealing studs 90 and grip studs 95 may generally alternate around the circumference of the face place 31.

Figure 6A:
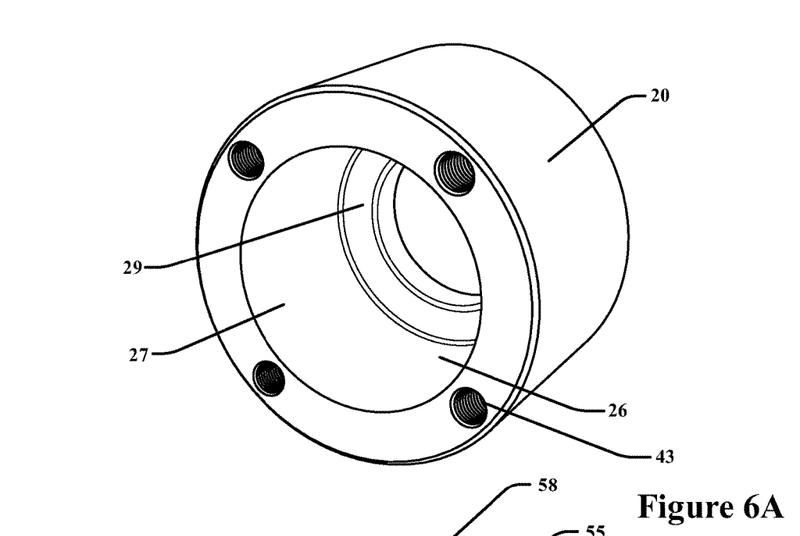
FIGS. 6A and 6B are various views of a housing for the pipe adapter of the instant disclosure.
Figure 6B:
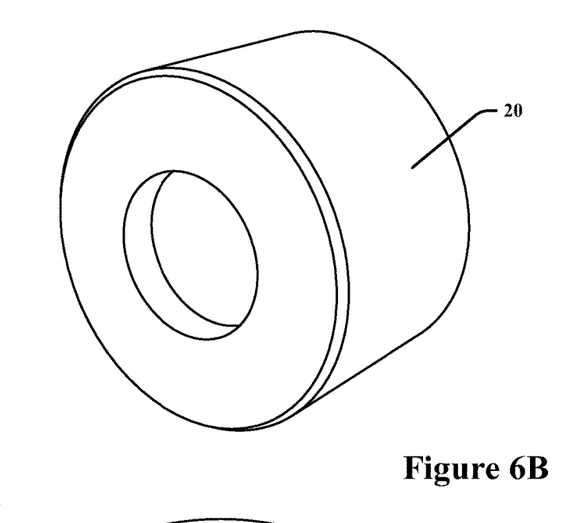
Figure 7A:
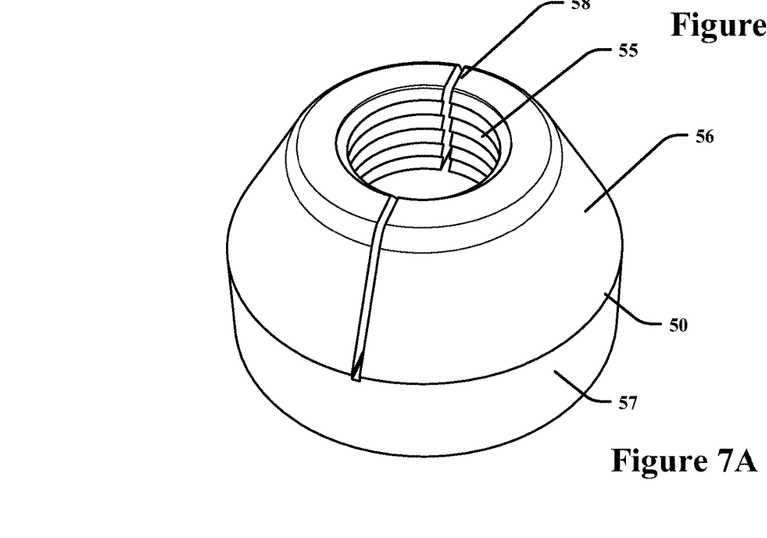
FIGS. 7A and 7B are various views of an embodiment of an insert for the pipe adapter of the instant disclosure.
Figure 7B:
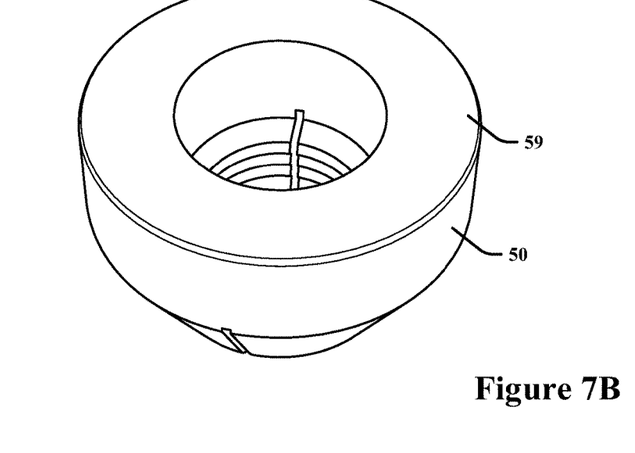

As stated herein, such studs, e.g. 90, 95 may traverse the adaptor 10 through a corresponding aperture, similar to the apertures 41 and fasteners 45 described in reference to FIGS. 8A and 8B and FIGS. 9D and 9E and which extend therethrough the grip actuator 30 for selective attachment with matching apertures 43, see FIG. 6A, positioned about the bore 26 and in the housing 20. For example, leak sealing studs 90 may correspond and mate with apertures 92 and grip studs 95 may correspond and mate with apertures 97, see FIG. 11B. Apertures 92, 95, and studs 90, 95, respectively, may similarly extend therethrough the grip actuator 30, and any other desired components of the adaptor 10, for selective attachment with matching apertures such as apertures 43, see FIG. 6A, positioned about the bore 26 and in the housing 20.

In an example, studs 45, 90, 95 may be threaded and selectively engage corresponding threading within the apertures 41, 92, 95. It is noted that the other fastening mechanisms may also be used other than threading, including locking ratchets, etc. When studs e.g. 45, 90, 95 are inserted through apertures, e.g. 41, 92, 95 of the grip actuator 30 and selectively attached therethrough to matching apertures of the housing, the studs 45, 90, 95 can be used to tighten the adaptor 10 and bring the grip actuator 30 closer to the housing 20. The studs 45, 90, 95 may be used to attach and install the pipe adaptor 10 to pipes. The studs 45, 90, 95 may be used to prevent or stop leaking of the pipes through the pipe adaptor 10. For example, when tightened, the studs 45, 90, 95 may create an equal or distributed pressure around the face plate 31 of the grip actuator, may move the grip actuator 30, and thereby the insert 50, closer to the housing 20, and may force the second ring 80 closer to the first ring 70 as well as the first ring 70 closer to the housing 20. Since at least one of the first ring 70 and the second ring 80 is compressible, e.g. first ring 70, and since at least one of the first ring 70 and the second ring 80 is non-compressible, e.g. second ring 80, the non-compressible ring may press against and compress the compressible ring to create a fluid-tight seal.

The studs 90, 95 connecting the grip actuator 30 and the housing 20 may be used to tighten the pipe adaptor 10 during install and to prevent or reverse leaks. Having a compressible component therein, such as first ring 70, as the studs 90, 95 are tightened, the compressible component may be compressed to form or reform a fluid seal. In an example, the studs 90, 95 may be tightened evenly around the face plate 31 of the grip actuator 30 until the leak stops. It is noted that either or both the leak sealing studs 90 and/or grip studs 95 may be used to tighten the pipe adaptor 10 and compress the compressible component as desired.

Although the embodiments of the present teachings have been illustrated in the accompanying drawings and described in the foregoing detailed description, it is to be understood that the present teachings are not to be limited to just the embodiments disclosed, but that the present teachings described herein are capable of numerous rearrangements, modifications and substitutions without departing from the scope of the claims hereafter. The claims as follows are intended to include all modifications and alterations insofar as they come within the scope of the claims or the equivalent thereof.

The invention claimed is:

1. A pipe adapter assembly comprising:
a housing that includes a lumen for fluid communication between a first end and a second end along a lumen and a bore positioned inwardly from said first end;
an insert that includes a passage that includes a plurality of teeth and having a tapered outer surface with at least one slot, wherein the insert is configured to fit within the bore of the housing and abut the bore of the housing;
a grip actuator that includes a flanged body and a protrusion wherein said protrusion having a generally circular configuration and is configured to fit within the bore of the housing, an abutment surface of the protrusion positioned radially inwardly relative to a perimeter of the protrusion that extends concentrically about an aperture through the grip actuator; and
a pair of sealing rings comprising a first ring that is compressible and a second ring that is non-compressible, wherein the pair of sealing rings are positioned between the housing and the insert;
wherein the pipe adapter is configured to receive a pipe member through said lumen, passage, and aperture; and
wherein the pipe adapter is configured to selectively lock the housing to the pipe member by translating the abutment surface against the tapered outer surface of the insert to bias the plurality of teeth against the pipe member.

2. The pipe adapter assembly of claim 1, wherein the abutment surface includes a configuration that is generally complementary relative to the outer surface of the insert.

3. The pipe adapter assembly of claim 1, wherein the abutment surface is tapered towards the aperture.

4. The pipe adapter assembly of claim 3, wherein the taper of the abutment surface has an angle that is about 60 degrees from a perpendicular plane relative to a central axis of the aperture.

5. The pipe adapter assembly of claim 1, the flanged body and the protrusion of the grip actuator are formed from a continuous piece of material.

6. The pipe adapter assembly of claim 1, wherein the bore of the housing is defined by a radial inner wall and a shoulder wall wherein the radial inner wall extends generally parallel to the axis of the housing and concentric to the lumen while the shoulder wall is aligned generally perpendicularly to the axis of the housing and concentric to the lumen.

7. The pipe adapter assembly of claim 6, wherein the insert and protrusion are configured to be received within the bore such that the axial lengths of the insert, protrusion, and bore are arranged in such a way that once the flanged body of the grip actuator is positioned towards the first end of the housing, the abutment surface of the protrusion abuts against the outer surface of the insert.

8. The pipe adapter assembly of claim 7, wherein a base wall of the insert abuts against the shoulder wall of the housing while the abutment surface abuts against the outer surface of the insert to cause the teeth along the passage of the insert to bias radially inwardly against an outer surface of the pipe member.

9. The pipe adapter assembly of claim 1, wherein the tapered outer surface of the insert is about 60 degrees from a perpendicular plane relative to a central axis of the insert.

10. The pipe adaptor assembly of claim 1 further including a fastening component.

11. The pipe adaptor assembly of claim 10, wherein the first ring is a rubber ring positioned in physical contact with the housing.

12. The pipe adaptor assembly of claim 10, wherein the fastening component includes at least two studs that extend through the grip actuator into the housing.

13. The pipe adaptor assembly of claim 10, wherein tightening the fastening component compresses the first ring and forms a fluid seal through the pipe adaptor assembly.

14. A pipe adapter assembly comprising:
a housing that includes a bore positioned inwardly from a first end;
a grip actuator that includes a flanged body and a protrusion, wherein said protrusion having a generally circular configuration and is configured to fit within the bore of the housing;
an insert having a tapered outer surface, wherein the insert is configured to fit between the housing and the grip actuator and to abut the bore of the housing;
a leak sealing mechanism that includes a compressible component, wherein the compressible component physically abuts an interior shoulder of the housing;
wherein the pipe adapter is configured to receive a pipe member through said housing, grip actuator, insert, and compressible component; and
wherein the pipe adapter is configured to selectively lock the housing to the pipe member and compress the compressible component to create a fluid seal.

15. The pipe adaptor of claim 14, wherein the pipe adapter is configured to selectively lock the housing to the pipe member by translating an abutment surface of the grip actuator against the tapered outer surface of the insert.

16. The pipe adaptor of claim 14, wherein the pipe adapter is configured to selectively lock the housing to the pipe member by biasing a plurality of teeth on the insert against the pipe member.

17. The pipe adaptor of claim 14, wherein the compressible component is a rubber ring and the leaking mechanism further includes a steel ring positioned adjacent the rubber ring.

18. The pipe adaptor of claim 17, wherein the rubber ring and steel ring are positioned between the housing and the insert.

19. The pipe adaptor of claim 18, wherein the leaking mechanism further includes at least two studs that extend through the grip adaptor into the housing.

20. The pipe adaptor of claim 19, wherein the studs are configured to be tighten and compress the rubber ring and create or re-create a fluid seal.

* * * * *